2,861,361
DETACHABLE POINT FOR EXCAVATING APPARATUS

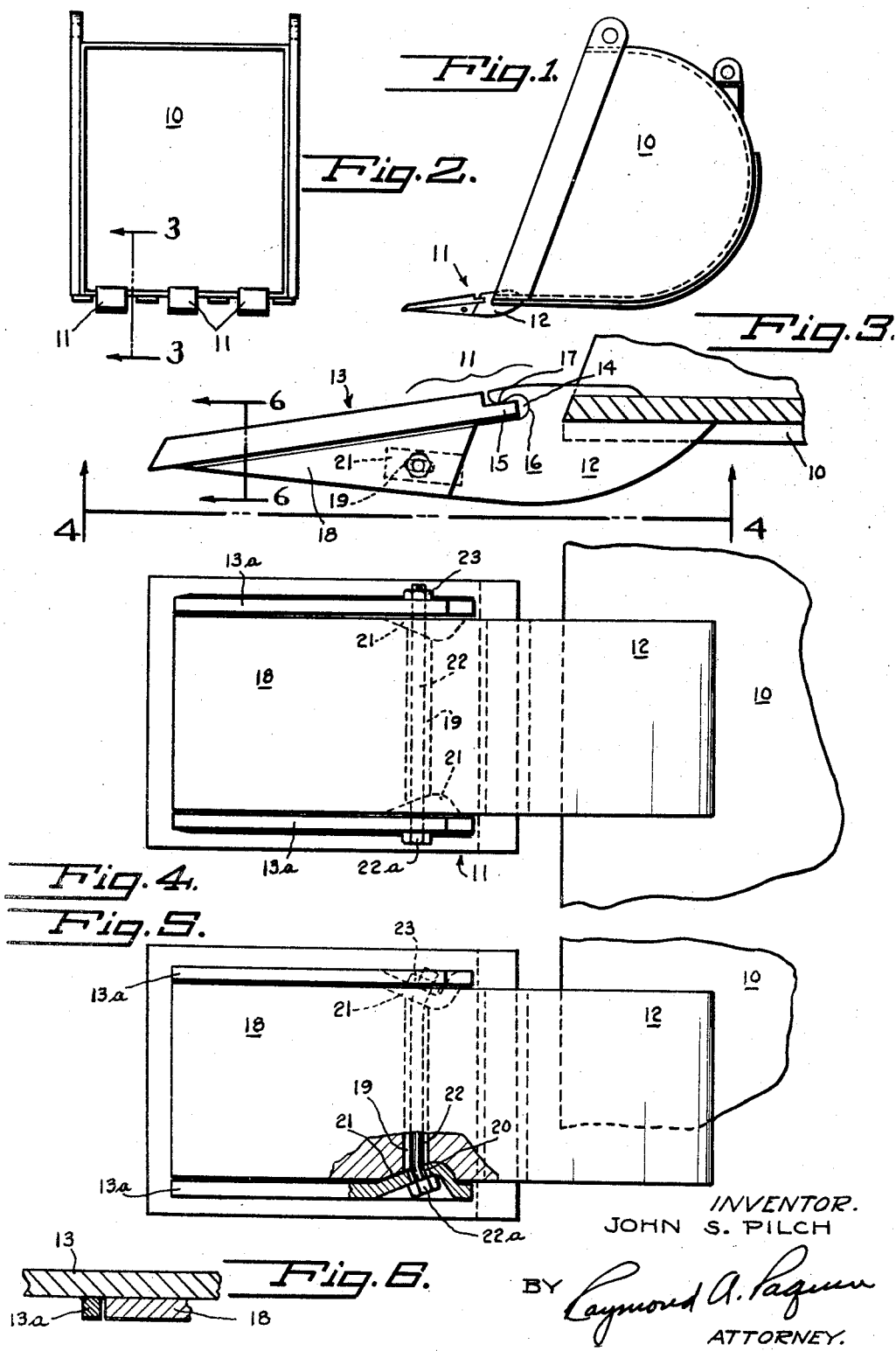

John S. Pilch, Ware, Mass.

Application November 2, 1955, Serial No. 544,409

4 Claims. (Cl. 37—142)

This invention relates to digging or excavating apparatus and has particular reference to the digging points or teeth of power operated buckets, trenchers or ditchers or the like.

An object of the invention is to provide an apparatus of the type set forth having new and improved means for securing the digging points or teeth to the bucket or trencher whereby such points or teeth are positively and rigidly connected to the bucket for digging but can be easily and quickly removed from the bucket for repair or replacement.

Other objects and advantages of the invention will be apparent from the following description taken in connection with the accompanying drawings. It will be understood that changes may be made in the details of construction and arrangement of parts shown and described without departing from the scope of the invention as set forth in the accompanying claims, as the preferred form has been given by way of illustration only.

Referring to the drawings:

Fig. 1 is a side view of a bucket for a ditcher embodying the invention;

Fig. 2 is a front view of the arrangement shown in Fig. 1;

Fig. 3 is a sectional view taken on line 3—3 of Fig. 2, looking in the direction of the arrows;

Fig. 4 is a view taken on line 4—4 of Fig. 3, looking in the direction of the arrows, illustrating a step in the connection of the tooth or point to the bucket;

Fig. 5 is a view generally similar to Fig. 4 but partially in section, and showing the tooth or point connected to the bucket; and Fig. 6 is a sectional view taken on line 6—6 of Fig. 3, looking in the direction of the arrows.

Referring more particularly to the drawings wherein similar reference characters designate corresponding parts throughout, the device shown embodying the invention comprises the bucket 10 having the teeth or digging points 11 attached thereto, each of which comprise a forwardly projecting shank 12 which is secured by welding or the like to the forward edge of bucket 10 and to the forward end of which is secured the tip 13.

Each of the shanks 12 has the recess or socket 14, in its forward edge adapted to receive the reduced end 15 on tip 13 and each of the sockets or recesses 14 has the full radius 16 at its inner end and a small raidus 17.

The tips 13 each have the spaced parallel sides 13a adapted to be positioned on opposite sides of forwardly extending portion or lug 18 on shank 12 and also said portion 18 has an elongated opening or slot 19 therethrough adapted to be aligned with aligned openings 20 in spaced sides 13a.

Opening or bore 19 is of larger diameter than openings 20 and in the sides of lug 18 overlying the ends of opening 19 are the flat countersink portions or recesses 21 which taper inwardly from their forward ends toward their rear ends as shown in Figs. 4 and 5.

The bolt 22 is positioned through aligned openings 19 and 20 and nut 23 is threaded onto the free end of bolt 22, and the head 22a of bolt 22 engages one side 13a and nut 23 engages opposite side 13a and when nut 23 is tightened, the portions of sides 13a are forced inwardly into engagement with flat countersinks 21 and such tightening of nut 23 causes the deflection of the portions of opposite ends of bolt 22 which extend through sides 13a.

As nut 23 is tightened it causes movement of bolt 22 in slot or opening 19 toward the deeper ends of the countersunk portions 21 thus forcing tip 13 into tight or rigid engagement with the shank and tip 13 is locked in operative position.

It will be seen that because of radius 16 and radius 17 in socket or recess 17 that the insertion of extension 15 into socket 17 will be facilitated and that also the upper edge of portion 15 will be locked in rigid engagement with radius 17 when tip 13 is locked in position on the shank as previously described.

To place the tip on the shank, the tip is placed on shank extension 18 with the bolt through aligned openings 19 and 20 as shown in Fig. 4 and nut 23 is then tightened to draw the portions of sides 13a into engagement with countersunk portions or recesses 21 in the sides of shank portions 18 with the ends of bolt 22 deflected as shown in Fig. 5 and as previously described.

To remove tip 13 from the shank, nut 23 is removed and bolt 22 removed from operative position.

From the foregoing it will be seen that I have provided new and improved means for obtaining all of the objects and advantages of the invention.

I claim:

1. In a device of the character described, a shank having a socket adjacent its upper edge and a forwardly extending lug, a tip overlying said forwardly extending lug and having a portion extending into said socket, said tip having sides overlying the sides of said lug, aligned openings through said sides and through said lug, a bolt and nut means in said aligned openings, said opening in said lug being larger than said openings in said sides of said tip, and recesses in the opposite sides of said lug adjacent the opposite ends of said opening in said lug whereby tightening of said bolt and nut means will draw portions of said sides into said recesses.

2. In a device of the character described, a shank having a socket adjacent its upper edge and a forwardly extending lug, a tip overlying said forwardly extending lug and having a portion extending into said socket, said tip having sides overlying the sides of said lug and aligned openings in said sides and lug and threaded securing means in said aligned openings, and recesses in the opposite side of said lug adjacent the opposite ends of said opening in said lug whereby tightening of said securing means will force portions of said sides into said recesses, said recesses tapering inwardly from the sides of said lug towards said opening in said lug.

3. In a device of the character described, a shank having a socket adjacent its upper edge and a forwardly extending lug, a tip overlying said forwardly extending lug and having a portion extending into said socket, said tip having sides overlying the sides of said lug and aligned openings in said sides and lug, threaded securing means extending through said aligned openings, said lug having recesses in the opposite sides thereof adjacent the opposite ends of said opening in said lug whereby tightening of said securing means will force portions of said sides into said recesses in said lug, said recesses tapering in a direction along the sides of said lug towards said opening in said lug whereby upon tightening of said securing means, the opposed ends of said securing means will be deflected out of aligned relation.

4. In a device of the character described, a shank having a socket adjacent its upper edge and a forwardly extending lug, a tip overlying said forwardly extending lug and having a portion extending into said socket, said tip having sides overlying the sides of said lug and aligned openings in said sides and lug, securing means extending through said aligned openings, and recesses in the opposite sides of said lug adjacent said opening in said lug whereby tightening of said securing means will force portions of said sides into said recesses in said lug, said recesses in said lug tapering inwardly from the sides of said lug towards said opening in said lug whereby upon tightening of said securing means, the opposed ends of said securing means will be deflected out of aligned relation, said securing means comprising a bolt extending through said aligned openings and a nut threaded on the free end of said bolt.

References Cited in the file of this patent

UNITED STATES PATENTS

| | | |
|---|---|---|
| 935,147 | Gardner | Sept. 28, 1909 |
| 2,124,230 | Hosmer | July 19, 1938 |
| 2,568,075 | Launder | Sept. 18, 1951 |